Nov. 14, 1961     J. R. FOSTER     3,008,512
TIRE BEAD BREAKING APPARATUS

Filed Sept. 23, 1959     3 Sheets-Sheet 1

INVENTOR.
JAMES R. FOSTER
BY Lowell & Henderson
ATTORNEYS

Nov. 14, 1961 J. R. FOSTER 3,008,512
TIRE BEAD BREAKING APPARATUS
Filed Sept. 23, 1959 3 Sheets-Sheet 2
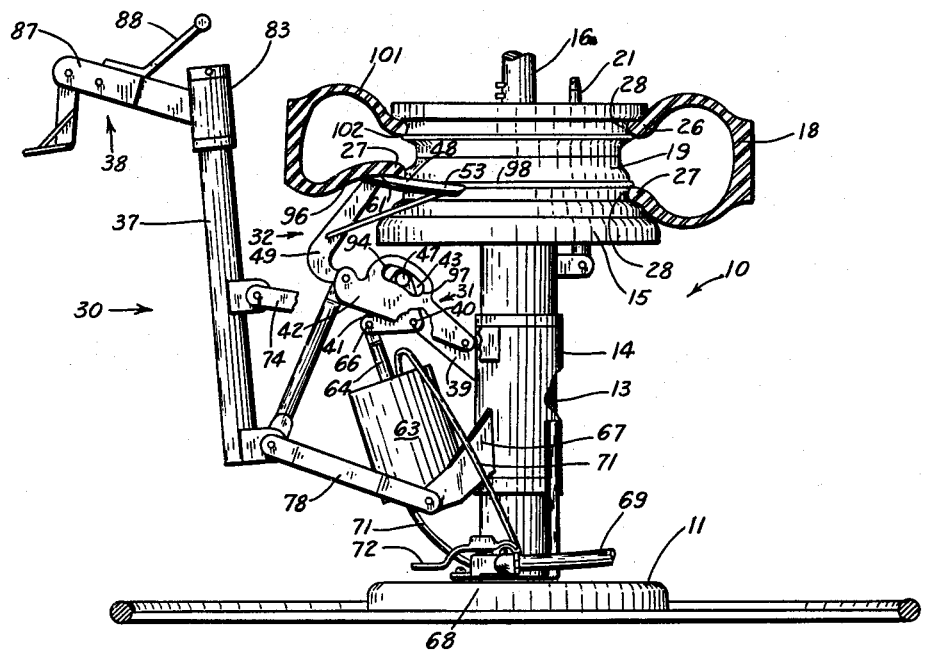
Fig. 3
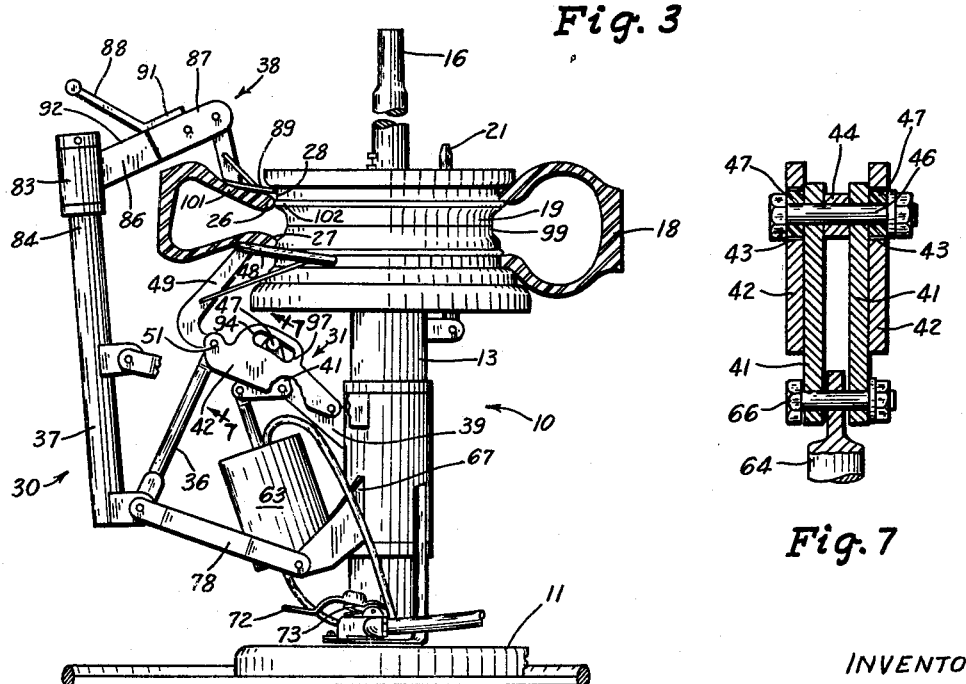
Fig. 5
Fig. 7
INVENTOR
JAMES R. FOSTER
BY
Lowell & Henderson
ATTORNEYS INVENTOR.
JAMES R. FOSTER
BY
Lowell & Henderson
ATTORNEYS 3,008,512
TIRE BEAD BREAKING APPARATUS
James R. Foster, South Fort Dodge, Iowa, assignor to Coats Company, Fort Dodge, Iowa, a partnership
Filed Sept. 23, 1959, Ser. No. 841,809
4 Claims. (Cl. 157—1.28)

This invention relates generally to tire handling equipment and in particular to a machine for breaking the beads of a pneumatic tire from the complementary flange portions of a wheel rim on which the tire is assembled or mounted.

An object of this invention is to provide an improved machine for breaking tire beads from an associated wheel rim.

A further object of this invention is to provide a machine wherein a pair of bead breakers for acting on opposite sides of the tire are independently operated in sequence by a single fluid-operated cylinder assembly.

Another object of this invention is to provide a machine in which a pair of bead breakers, actuated simultaneously by a common fluid-operated cylinder assembly, are relatively associated for an independent bead breaking action with opposite sides of a tire, whereby the full power of the cylinder assembly is utilized for breaking each tire bead from a complementary rim flange.

Still a further object of this invention is to provide a tire bead breaking machine having a horizontal table for supporting a tire and wheel assembly, in which upper and lower bead breakers, sequentially movable in up and down directions by a single power unit, are relatively assembled so that the lower bead breaker is effective only during its upper movement and the upper bead breaker is effective only during its downward movement.

Another object of this invention is to provide a tire bead breaking machine capable of obtaining the above designated objects and which is economical to manufacture, simple to operate and to service, and effective in operation.

These objects and other features and advantages of this invention will become readily apparent from the following description and the accompanying drawings, wherein:

FIG. 3 is a view similar to FIG. 2 showing the lower bead breaking shoe moved upwardly from the inoperative position of FIG. 2;

FIG. 5 is a view similar to FIG. 4 showing the upper bead breaking shoe moved downwardly from the dotted line position of FIG. 4;

FIG. 7 is an enlarged sectional detail view of an actuating unit for the upper and lower bead breakers as seen along the line 7—7 in FIG. 5.

Figure 1:
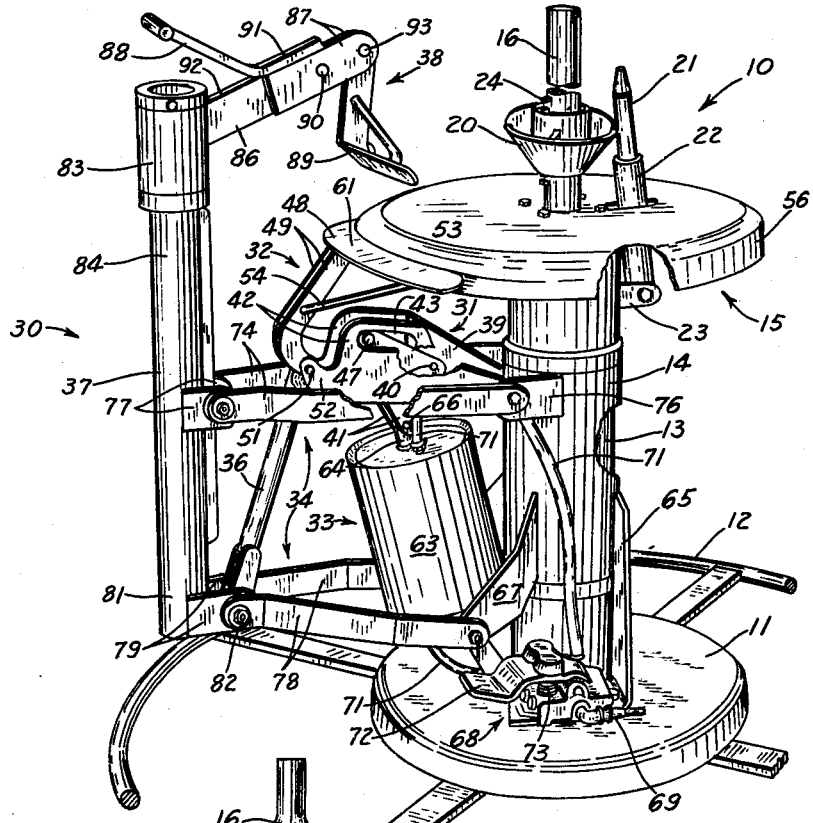
FIG. 1 is a perspective view of the tire bead breaking device of this invention in an inoperative or rest position, with some parts broken away for the purpose of clarity.

With reference to the drawings, the tire bead breaking device of this invention, indicated generally at 10 is illustrated in FIG. 1 as including a flat circular base 11 and an optional rollaway base 12, adapted to be supported on a floor surface. A central tubular standard 13 is secured to and projects upwardly from the center of the base 11. A tubular frame or journal 14 is rotatably mounted on the standard 13, and on the upper end of the standard 13 and in a concentric relation therewith is a horizontal wheel supporting table unit 15. The table unit is of a size to receive conventional vehicular wheels for fourteen, fifteen, and sixteen inch tires. Coaxially arranged and projected upwardly from the standard 13 is a shaft 16 which acts as a center post for the table 15.

In mounting a tire and wheel rim assembly 17 (FIG. 2) consisting of a tire 18 of the tubeless type mounted on a wheel 19, on the device 10, the assembly 17 is arranged in a flat, horizontally supported position on the table unit 15, with the center post 16 extended upwardly through a central opening (not shown) in the wheel 19. With the assembly 17 in this horizontal position, the extensible outer portion 21 (FIG. 1) of a dowel unit 22, pivotally secured to ears 23 carried on the standard 13 at a position below the table unit 15, is extended through one of the bolt receiving apertures (not shown) in the wheel 19 to hold the wheel against rotation on the table unit 15.

The wheel 19 is centered relative to the center post 16 and in turn relative to the table unit 15 by the provision of a wheel clamping unit 20 (FIG. 1) comprising a cone-shaped member having a tubular hub for rotation with a threaded rack 24 secured to and extended axially of the post 16 at a position above the table unit 15. In use, the clamping unit 20 is rotated downwardly on the center post 16 to an engaged position with the side wall of the center opening in the wheel 19, whereby to tightly clamp the wheel 19 against the table unit 15. A detailed description of the clamping unit is set forth in U.S. Patent No. 2,895,519 issued July 21, 1959 to Gilbert E. Coats.

For the purpose of breaking the upper and lower tire beads 26 and 27, respectively, out of engagement with their respective wheel rim or flange portions 28 and inwardly therefrom of the wheel rim 29, a dual-action bead breaking assembly 30 (FIGS. 1 and 2) is provided. The assembly 30 comprises generally an actuating unit 31, a lower bead breaking unit 32, a double-acting power unit 33, a parallel linkage unit 34, a connecting link 36, an upright support 37, and an upper bead breaking unit 38.

The actuating unit 31 includes a flat arm 39 (FIG. 2) secured at one end to the frame 14. A pair of parallel triangular plates 41 (FIGS. 2, 5 and 7) are pivotally connected in a straddling manner to the outer end of the arm as by a pin 40. At the inner end of the arm 39, a pivot pin 45 (FIG. 2) mounts a pair of parallel lift arms 42 of an irregular shape which straddles both the arm 39 and the plates 41 (FIG. 7). To effect a coaction between the plates 41 and the lift arms 42, a pair of rollers 47 (FIGS. 2 and 7) are mounted at the outer ends of a roller bolt 46 inserted through aligned openings in the plates 41 and a spacer 44 therefor. The rollers 47 are received in a pair of transversely aligned, arcuate slots 43

(FIG. 2) formed in the lift arms 42. As will be seen hereinafter, this arrangement provides for a cam and cam-follower type action between the plates 41 and the lift arm 42.

The lower bead breaking unit 32 includes a curved, elongated shoe 48 (FIG. 1) carried on the upper ends of a pair of parallel upright supporting shanks 49 the lower ends of which are connected by a pivot 51 to the outer ends 52 of the lift arms 42. The shoe 48 has its end portions 53 braced by rods 54 connected to the shanks 49, and is of a curvature which corresponds substantially to the curvature of the depending peripheral flange 56 of the table 15.

The power unit 33 (FIGS. 1 and 2) for pivotally moving the plates 41 and thus operating the actuating unit 31, includes an upright double-acting, fluid-operated cylinder 63, having a piston 64 pivotally connected at its exposed, outer end by a bolt 66 (FIG. 2 and 7) to the plates 41. The cylinder 63 is mounted on a wing-type bracket 67 secured to the rotatable frame 14, and to which is also secured by an elongated brace 65, a commercial air valve device 68 for directing pressurized air from a supply line 69 through a pair of outlet lines 71 to the cylinder 63. The air valve 68 is operated by a food treadle 72 maintained in a normally raised, inoperative position by a spring 73.

The parallel linkage unit 34 for raising and lowering the upper bead breaking support 37 in response to operation of the power unit 33, comprises an upper pair of paralleled link arms 74 (FIGS. 1 and 2) pivotally connected at their inner ends to a pair of projections 76 secured to the frame 14, which arms 74 are extended outwardly therefrom in a straddling relation to the actuating unit 31 to a pivotal connection at their outer ends with another pair of projections 77 secured to the upright support 37. The linkage unit 34 also includes a lower pair of parallel link arms 78 arranged in a straddling relation with the cylinder 63, and pivotally connected at their inner ends to the bracket 67 (FIG. 1), and pivotally connected at their outer ends to a pair of projections 79 secured to the upright support 37 at the bottom end 81 thereof. Also secured to the pivot 82 between the lower link arms 78 and the projections 79, is the connecting link 36, the upper end of which is pivotally connected at the pivot 51 for the supporting shanks 49 and the lift arms 42 (FIG. 1).

The upper bead breaking unit 38 (FIG. 1) includes a tubular bearing member 83, rotatably mounted at the upper end 84 of the support 37, and having a radially extended arm 86. Pivotally secured at 90 to the outer end of the arm 86 and in a straddling relation therewith is a pair of parallel, flat plates 87 the upper edges of which are interconnected by the shank 91 of a hand bar 88. An upper bead breaking shoe 89 is pivotally mounted at the outer ends of the plates 87, and is of a curved elongated construction similar to that of the lower bead breaking shoe 48. It is seen, therefore, that the arm 86 is rotatable about the upright support 37, and that the plates 87 are pivoted as a unit about the arm 86 (FIG. 1) in a counter clockwise direction to a stop position defined by the shank 91 contacting the arm 86, and that the shoe 89 is swingable freely from its pivot connection 93 with the plates 87.

Figure 2:
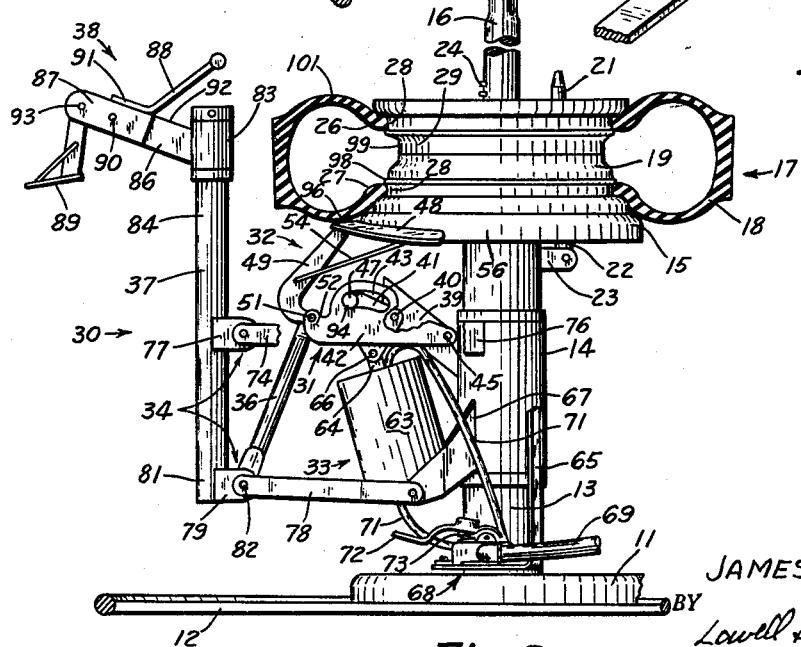
FIG. 2 is a fragmentary, side elevational view of the device of FIG. 1, shown in the inoperative position and in assembly relation with a tire and wheel assembly, some parts being broken away and others being shown in section for illustrative purposes.

In operation of the device 10 to break or move the upper and lower tire beads 26 and 27, respectively, out of engagement with their respective rim portions 28, assume the device 10 to be in the inoperative or rest position shown in FIGS. 1 and 2 with the tire and wheel assembly 17 mounted on the table unit 18 and secured against rotatable, vertical and transverse movements. It will be noted in this position that the link arms 74 and 78 are substantially horizontal, the upright support 37 is substantially vertically disposed, and that the rollers 47 are located at the outer ends 94 of the slots 43. Additionally, the upper bead breaking unit 38 is swung away from the tire 18, as illustrated in FIG. 2, to an inoperative position.

Upon a depression of the treadle 72 by the foot of the operator, air pressure is supplied to the cylinder 63 so that the piston 64 is extended or moved outwardly therefrom. The upward movement of the piston is transmitted through the plates 41 (FIG. 3) and the rollers 47 whereby to pivot the lift arms 42 in a clockwise direction, as also viewed in FIG. 3. This actuation of the unit 31 causes the lower shoe 48 to be carried upwardly and forced against the lower side wall 96 of the tire 18. Advantageously, due to the slight downward inclination of the end portions 53 (FIG. 3) of the shoe 48, only the central portion 61 thereof initially engages the tire side wall 96 whereby to localize the working pressure or effort of the piston and cylinder 63.

Figure 4:
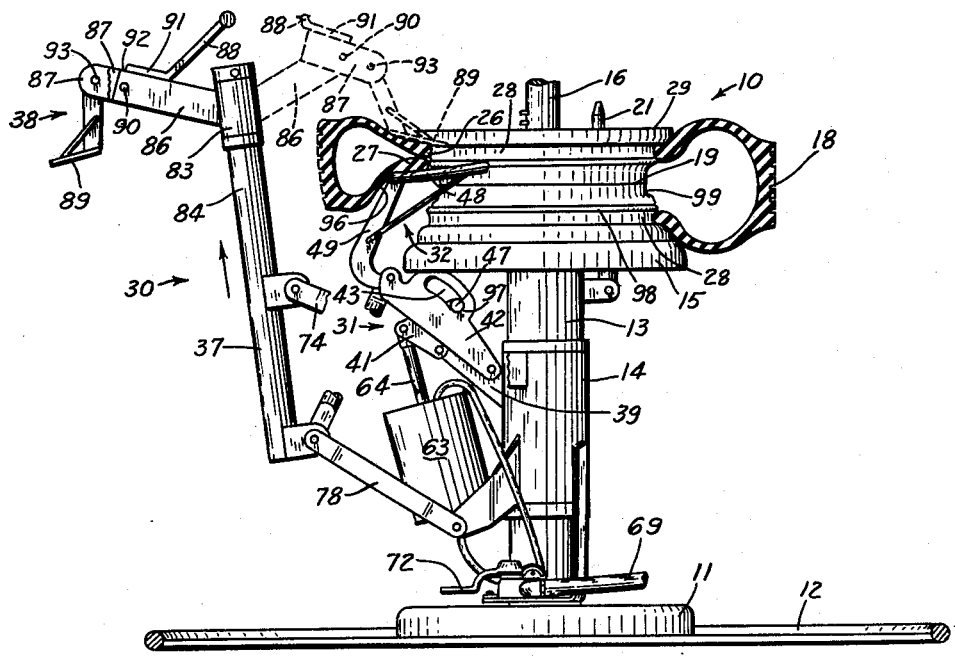
FIG. 4 is a view similar to FIG. 3 showing the lower bead breaking shoe in its top most operating position, and showing also alternate inoperative and operative positions of the upper bead breaking shoe.

In the intermediate positions of the actuating unit 31 and the lower bead breaking unit 32 as illustrated in FIG. 3, the lower tire bead 27 has been broken and moved away from the wheel rim flange 28 along with being rolled over the rim projection 98 to a position inwardly thereof. Continued upward movement of the piston 64 to operate the actuating unit 31, moves the rollers 47 over the full length of the slots 43 against the slot inner ends 97 (FIG. 4). This action of the rollers continues the upward clockwise movement of the lift arms 42 (FIG. 4) thus raising, by means of the supporting shanks 49, the lower shoe 48 to its uppermost position whereby the shoe 48 moves the tire bead 27 further upwardly to the drop center 99 on the wheel rim 29. In the final position of the actuating unit 31, therefore, (FIG. 4), the lower bead 27 is moved completely away from the rim projection 98 to a position with in or outwardly from the drop center 99 of the rim 29. Thus, during the entire lower bead breaking operation the lower shoe 48, in rolling or moving the bead 27 away from the rim portion 28, contacts the lower side wall 96 at a position adjacent the bead 27. It is to be remembered that during the entire operation of the lower bead breaking unit 22, the upper unit 38 has remained in its inoperative position.

The arcuate extent of the tire lower bead 27 broken away from the rim portion 28 by this operation is generally sufficient to break the entire bead; however, should such not be the case, the treadle 72, upon removal of the operator's foot, will be spring-returned to its upper, inoperative position. The piston 64 is thus returned to its normal position within the cylinder 63 (FIG. 2) and the actuating unit 31 and the lower bead breaking unit 32 are lowered to their respective inoperative positions. The tire bead breaking assembly 30 may then be rotated on the frame 14 about the standard 13 until the lower shoe 48 is beneath a section of the unbroken portion of the lower bead 27. The above-described operation is then repeated to thereby break and move the remaining tire bead 27 out of engagement with the corresponding rim portion 28.

For the purpose of breaking the upper bead 26, assume the actuating unit 31 to be in its raised position, best illustrated in FIG. 4. As depicted in FIGS. 2–4, inclusive, as the lift arms 42 were moved upwardly and in a clockwise direction the parallel linkage unit 34 and thus the upright support 37 were also moved upwardly to the raised position of FIG. 4 by means of the connecting link 36. In this raised position, the upper bead breaking unit 38 is manually rotated from the full line position of FIG. 4 to the dotted line position thereof. Due to the pivotal movement of the pair of upper bead breaking plates 87 and the upper shoe 89 relatively to each other and also relative to the arm 86, the shoe 89 is readily positioned on the upper sidewall 101 of the tire 18 and against the wheel rim irrespective of the wheel size. For example, should a wheel be of a larger size than the wheel 19 depicted in FIG. 4, the upper bead breaking plates 87 could be pivoted clockwise from the dotted line position until the pivot 93 is underneath the arm 86 to provide for the shoe 89 being movable to a position different from the dotted line position thereof in FIG. 4, but in which the shoe would be against the wheel rim and on the upper side wall of the tire for the larger wheel. This arrangement enables the operator to quickly position the top bead breaking shoe 89 to accommodate the particular size tire and wheel assembly mounted on the device 10.

When the shoe 89 is positioned against the wheel rim and on the upper side wall 101, the valve treadle 72 is released whereby the cylinder 63 is operated to move the piston 64 downwardly from its fully extended position of FIG. 4. On downward movement of the piston 64, the rollers 47 of the actuating unit 31 (FIG. 5) are moved from inner slot ends 97 outwardly toward the outer slot ends 94, whereby the lift arms 42 are moved downwardly. This downward movement of the lift arms 42 pulls the lower bead breaking shoe 48 away from the loosened lower bead 27, concurrently with moving the connecting link 36 to lower the upright support 37.

Figure 6:
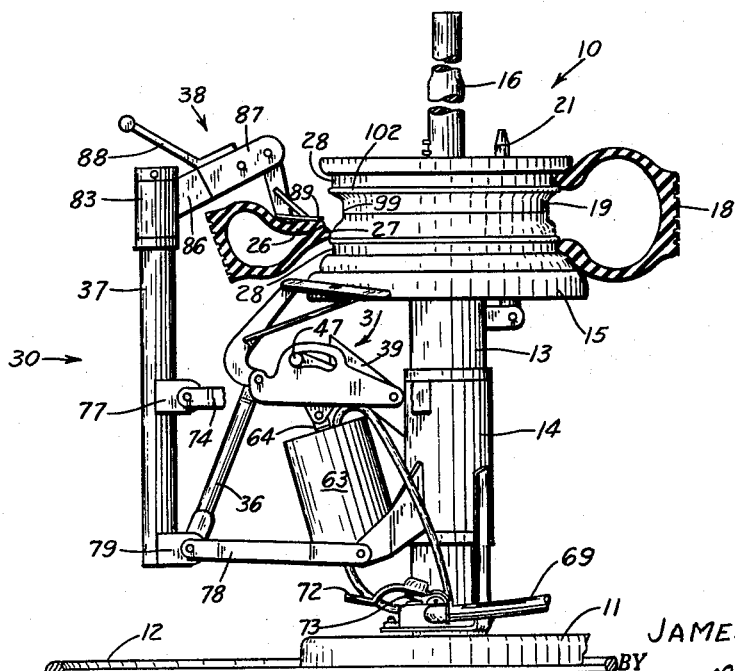
FIG. 6 is a view similar to FIG. 5 showing the upper bead breaking shoe in its lowermost operating position.

The downward movement of the support 37 moves the upper bead breaking plates 87 into a locked position with the arm 86 via the hand bar shank 91 contacting the upper edge 92 of the arm 86. By virtue of the pivot connection 93, the shoe 89 is maintained in a position against the wheel rim during the movement of the plates 87 into locked engagement with the arm 86 (FIGS. 4 and 5). Continued movement of the piston 64 into the cylinder 63 moves the upper shoe 89 downwardly against the tire upper side wall 101 until the side wall breaks away from the upper rim flange 28 (FIG. 5) and is rolled over the upper rim projection 102 and down into the drop center 99 (FIG. 6).

As was the case with the lower bead breaking operation, should a portion of the upper bead 26 remain unbroken or unloosened, the foot treadle 72 is depressed to again raise the assembly 30 to the FIG. 4 position. The frame 14 is then rotated and the upper shoe 89 is applied to the unbroken bead portion. In most instances, after the first bead breaking operation, the remainder of the bead is readily movable by hand out of engagement with its corresponding rim portion.

From the above description, it is seen that this invention provides a tire bead breaking device 10 having upper and lower bead breaking units 38 and 32 respectively, which are assembled for an effective sequential operation relative to each other and which are both powered simultaneously by a single unit 33. Thus, during an upward power stroke of the unit 33, the lower bead breaking unit 32 is readily operable to roll the lower bead 27 for the tubeless tire 18 out of engagement with the complementary portion 28 of the tire rim 29 and into the drop center thereof; and during the return downward power stroke of the unit 33, the upper bead breaking unit 38 is operable against the upper bead 26 in a like manner and with the same result as the lower bead 27. Obviously, the device 10 is equally adapted to the usual pneumatic tires having tubes.

Although the invention has been described with respect to a preferred embodiment thereof, it is to be understood it is not to be so limited, since changes can be made therein which are within the full intended scope of this invention as defined by the appended claims.

I claim:

1. In a machine for supporting a tire and wheel assembly including an upright standard provided with a horizontal wheel support, a bead breaking mechanism comprising a journal member rotatably carried on said standard, an upright support, first means movably connecting said support with said journal member for axial movement of the support, a first bead breaker for breaking the lower bead of a tire of said assembly movably connected with said journal member for up and down movement into and out of engagement with the lower side of said tire, other means movably connected with said lower bead breaker and with said first connecting means to provide for an axial movement of said upright support in response to an up and down movement of said first bead breaker, a second bead breaker for breaking the upper bead of the tire of said assembly rotatably supported on said upright support for rotational movement about the longitudinal axis of said support so as to be movable to a position remote from said wheel support to clear the tire and wheel assembly when said upright support is in its lower position and to a position over the tire when the upright support is in its upper position for breaking the upper bead on downward movement of said first bead breaker, and power means on said journal member for moving said first bead breaker.

2. In a machine for supporting a tire and wheel assembly including an upright standard provided with a horizontal wheel support and means for locking said assembly on said support, mechanism for breaking the lower and upper beads of a tire of an assembly locked on said wheel support including a journal member rotatably supported on said standard for rotational movement thereabout, a link system including a pair of vertically spaced links extended radially of said standard with one of their ends pivotally connected with said rotatable journal member, an upright link spaced from said table and pivotally connected with the other ends of said pair of links, a first means for breaking said lower bead including a supporting arm pivotally connected at one end with said rotatable journal member and extended radially therefrom, a shoe member having a first portion engageable with said tire and a second upright portion pivotally connected with the outer end of said arm, a connecting link pivotally connected with the outer end of said arm and with the outer end of the lower link of said pair of links, a second means for breaking said upper bead rotatably supported on said upright link for rotational movement thereabout, and an upright double-acting fluid cylinder assembly pivotally connected with said rotatable journal member and with said arm for pivotally moving said link system.

3. A device for breaking the beads of a pneumatic tire from the rim flange of a wheel, comprising a support for holding a wheel while a tire carried thereby is being worked upon, an actuating mechanism pivotally mounted at one end to said support for pivotal up and down movement of the other end thereof at one side of a wheel mounted on said support, a first bead breaking member pivotally mounted on the other end of said actuating mechanism having a horizontal curved tire engaging surface facing said support, a fluid cylinder assembly pivotally connected to said support and to said mechanism for pivotally moving said mechanism, a second bead breaking member, an upright mounting for said second bead breaking member located outwardly from said first bead breaking member and carried on said support for pivotal up and down movement, means extended between and connected to said mounting and to said actuating mechanism to move said mounting in response to the pivotal up and down movement of said actuating mechanism, said second bead breaking member having a horizontal curved tire engaging surface facing said support when in a first position to engage a tire, and means rotatably supporting said second bead breaking member on said mounting for movement to a second position remote from said tire, whereby said second bead breaking member can be moved out of the way into an ineffective position for an upward movement of said actuating mechanism but is movable to said first, or effective, position for a downward movement of said actuating mechanism.

4. A device for breaking the beads of a tire from the rim flanges of a wheel comprising a support for holding a wheel while a tire carried thereby is being worked upon, an actuating mechanism pivotally mounted at one end on said support for pivotal up and down movement of the other end thereof at one side of a wheel mounted on said support, a lower bead breaking unit pivotally mounted on said other end and having a portion for engaging the lower side of a tire, an upper bead breaking unit having a portion engageable with the upper side of a tire, an upright mounting for said upper bead breaking unit located outwardly from said lower bead breaking unit, means movably supporting said upper bead breaking unit on said upright mounting for movement of said upper bead breaking unit into and out of a position at which the tire engaging portion thereof is effective to engage the tire upper side, means connecting said upright mounting with said actuating mechanism for movement therewith, and a double acting fluid pressure cylinder assembly mounted on said support for operating said actuating mechanism.

References Cited in the file of this patent

UNITED STATES PATENTS

| | | |
|---|---|---|
| 2,413,010 | Teegarden | Dec. 24, 1946 |
| 2,695,659 | Athmann | Nov. 30, 1954 |
| 2,749,975 | Curtis | June 12, 1956 |
| 2,920,664 | Lomen et al. | Jan. 12, 1960 |